US011898625B1

(12) United States Patent
Reimchen et al.

(10) Patent No.: US 11,898,625 B1
(45) Date of Patent: Feb. 13, 2024

(54) STATOR ASSEMBLY

(71) Applicant: Schaeffler Technologies AG & Co. KG, Herzogenaurach (DE)

(72) Inventors: Alexander Reimchen, Herzogenaurach (DE); Christopher Krause, Polk, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 18/096,058

(22) Filed: Jan. 12, 2023

(51) Int. Cl.
*F16H 41/28* (2006.01)
*F16H 41/24* (2006.01)

(52) U.S. Cl.
CPC ....... *F16H 41/28* (2013.01); *F16H 2041/246* (2013.01)

(58) Field of Classification Search
CPC .......... F16H 41/28; F16H 33/18; F16H 33/20; F16H 2041/246
USPC ................................ 416/180, 197 C; 60/345
See application file for complete search history.

(56) References Cited

U.S. PATENT DOCUMENTS

| 5,007,746 | A  | * | 4/1991  | Matzelle ................. | F16C 35/02 |
|-----------|----|---|---------|---------------------------|------------|
|           |    |   |         |                           | 384/429    |
| 8,613,352 | B2 | * | 12/2013 | Savu ..................... | F16D 41/066 |
|           |    |   |         |                           | 192/113.32 |
| 9,822,826 | B2 | * | 11/2017 | Lindemann ............. | F16H 41/24 |
| 9,964,192 | B2 | * | 5/2018  | Smith ..................... | F16H 41/28 |
| 10,598,212 | B2 |   | 3/2020  | Lewis et al.              |            |
| 2007/0220876 | A1 | * | 9/2007 | Brees ..................... | F16D 41/125 |
|           |    |   |         |                           | 60/345     |
| 2016/0273635 | A1 | * | 9/2016 | Dattawadkar ........... | F16H 41/24 |
| 2018/0073554 | A1 | * | 3/2018 | Lewis .................... | F16C 33/101 |
| 2019/0383375 | A1 | * | 12/2019 | Krause .................... | F16H 41/28 |

FOREIGN PATENT DOCUMENTS

| DE | 2221713 A1    | 11/1973 |
|----|---------------|---------|
| DE | 4234687 A1    | 5/1993  |
| DE | 69215623 T2   | 7/1997  |
| DE | 102004060257 A1 | 7/2006 |
| DE | 102013214352 A1 | 1/2015 |

* cited by examiner

*Primary Examiner* — Courtney D Heinle
*Assistant Examiner* — Ryan C Clark

(57) ABSTRACT

A stator assembly for a torque converter includes a body, a one-way clutch, and a washer. The body is rotatable about an axis and has a cavity defined by an axial wall radially spaced from the axis and a radial wall extending radially inward from the axial wall. The one-way clutch is disposed in the cavity. The washer includes a thrust surface, a supporting surface, and an axial retention feature. The thrust surface faces away from the cavity. The supporting surface directly contacts the one-way clutch. The axial retention element is configured to connect to the axial wall of the body.

20 Claims, 5 Drawing Sheets

STATOR ASSEMBLY

TECHNICAL FIELD

The present disclosure relates generally to a stator assembly for a torque converter, and more specifically to a stator assembly including a thrust washer connected to a stator body and a torque converter including the stator assembly.

BACKGROUND

Many vehicles include a launch device between the engine and the transmission. A torque converter is a type of launch device commonly used in vehicles having an automatic transmission. A typical torque converter includes an impeller fixed to the crankshaft of the engine and a turbine fixed to a turbine shaft, which is the input to the transmission. To improve fuel economy, a torque converter may include a stator assembly disposed axially between the turbine assembly and the impeller assembly that redirects fluid flowing from the turbine assembly before the fluid reaches the impeller assembly. In some stator assembly arrangements, the stator assembly may include a side plate connected to a stator body and configured to retain a one-way clutch within the stator body, and a thrust washer disposed axially between the side plate and the impeller assembly. In such arrangements, the thrust washer may be connected to the side plate to prevent relative motion between the thrust washer and the side plate. It is desirable to have alternative designs and configurations to prevent relative motion between the thrust washer and the stator body while limiting the complexity of the torque converter.

SUMMARY

Embodiments of the present disclosure provide a stator assembly for a torque converter. The stator assembly includes a body, a one-way clutch, and a washer. The body is rotatable about an axis and has a cavity defined by an axial wall radially spaced from the axis and a radial wall extending radially inward from the axial wall. The one-way clutch is disposed in the cavity. The washer includes a thrust surface, a supporting surface, and an axial retention feature. The thrust surface faces away from the cavity. The supporting surface directly contacts the one-way clutch. The axial retention element is configured to connect to the axial wall of the body.

In embodiments, the axial wall may include a channel radially aligned with a portion of the one-way clutch. The axial retention element may be configured to engage the channel. The axial retention element may include a radial portion extending outwardly from an outer circumference of the washer. The axial retention element may further include an axial portion extending from an end of the radial portion. The axial retention element may further include a tab disposed on the axial portion and configured to directly contact a radial surface of the channel. The tab may be disposed between an end of the axial portion and the radial portion. The axial portion may be disposed radially between a portion of the one-way clutch and a portion of the axial wall. The axial portion may be configured to contact a portion of the axial wall and be radially spaced from the one-way clutch. The axial retention element may include circumferential ends spaced from each other. The tab may be spaced from at least one circumferential end.

In embodiments, the axial retention element may extend from the supporting surface. In embodiments, the axial retention element may be axially spaced from the thrust surface. In embodiments, the thrust surface may include a plurality of grooves each extending from an inner circumferential surface to an outer circumferential surface of the washer. The grooves may be circumferentially spaced from each other. The axial retention element may include circumferential ends spaced from each other. Each end may be radially aligned with one respective groove.

In embodiments, the axial retention element may be arranged on an outer circumference of the washer. In embodiments, the axial retention element may be disposed radially outside of the one-way clutch. In embodiments, a portion of the axial retention element may be radially aligned with a portion of the one-way clutch.

Embodiments of the present disclosure further provide a torque converter including a front cover, an impeller, a turbine, and a stator assembly. The front cover is arranged to receive a torque. The impeller has an impeller shell non-rotatably connected to the cover. The turbine is in fluid communication with the impeller and includes a turbine shell. The stator assembly is disposed axially between the impeller shell and the turbine shell. The stator assembly includes a body, a one-way clutch, and a washer. The body is rotatable about an axis and has a cavity defined by an axial wall radially spaced from the axis and a radial wall extending radially inward from the axial wall. The one-way clutch is disposed in the cavity. The washer includes a thrust surface, a supporting surface, and an axial retention element. The thrust surface contacts one of the impeller shell or the turbine shell. The supporting surface directly contacts the one-way clutch. The axial retention element is configured to connect to the axial wall of the body.

In embodiments, the axial retention element may extend from the supporting surface. In embodiments, the axial retention element may be axially spaced from the thrust surface. In embodiments, the axial retention element may be disposed radially outside of the one-way clutch.

In embodiments, the axial wall may include a channel radially aligned with a portion of the one-way clutch. The axial retention element may be configured to engage the channel. The axial retention element may include a radial portion extending outwardly from an outer circumference of the washer. The axial retention element may further include an axial portion extending from an end of the radial portion. The axial retention element may further include a tab disposed on the axial portion and configured to directly contact a radial surface of the channel.

Embodiments disclosed herein provide the advantageous benefit of non-rotatably connecting a thrust washer to a stator body, which prevents relative rotation between the thrust washer and the stator body during operation of a torque converter. Furthermore, embodiments disclosed herein offer design advantages by non-rotatably connecting the thrust washer directly to the stator body, which reduces costs and complexity of the torque converter, e.g. by removing a side plate that is typically used to retain a one-way clutch within a stator body.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
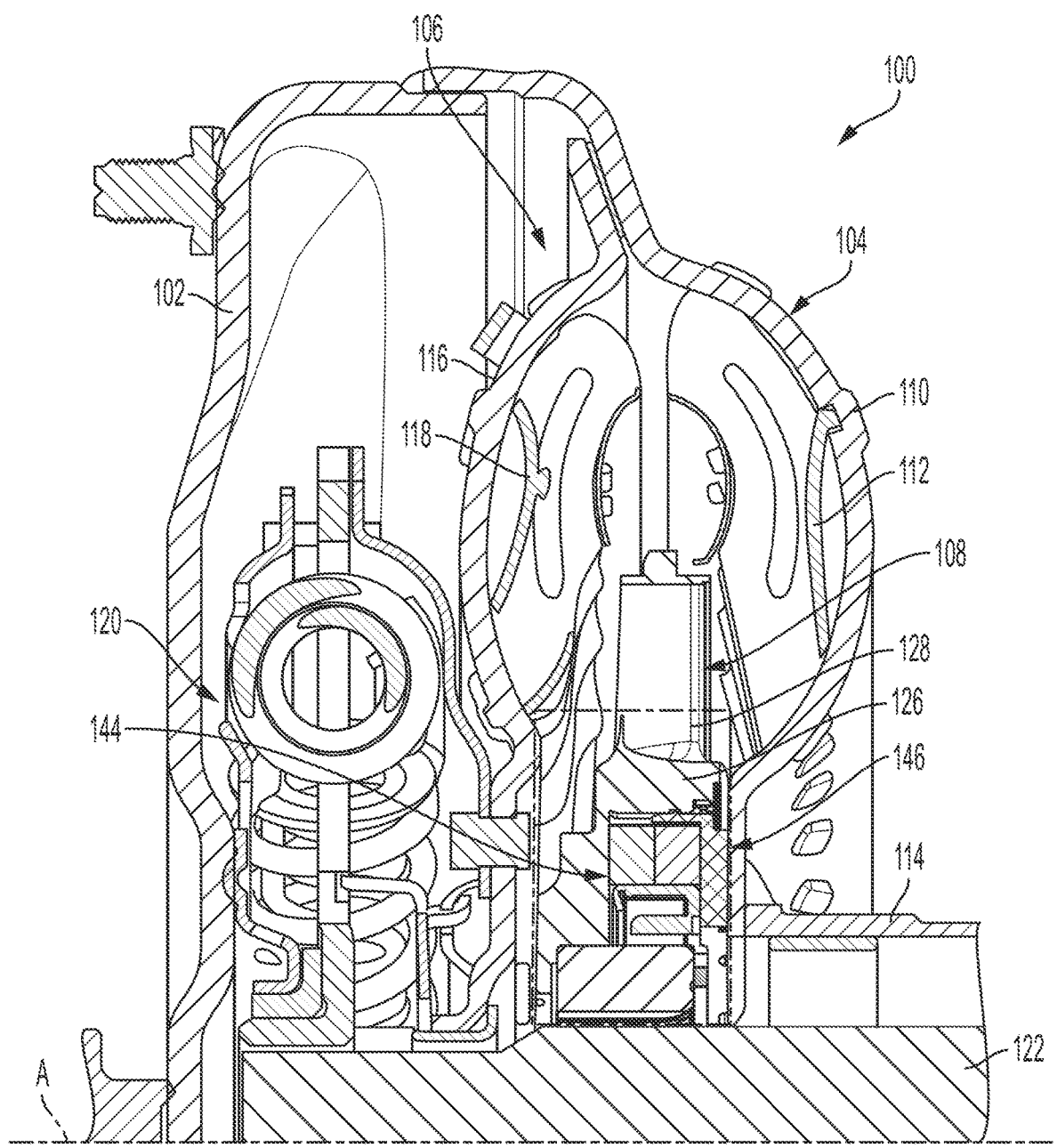
FIG. 1 illustrates a cross-sectional view of a torque converter having a stator assembly according to the present disclosure.
Figure 2:
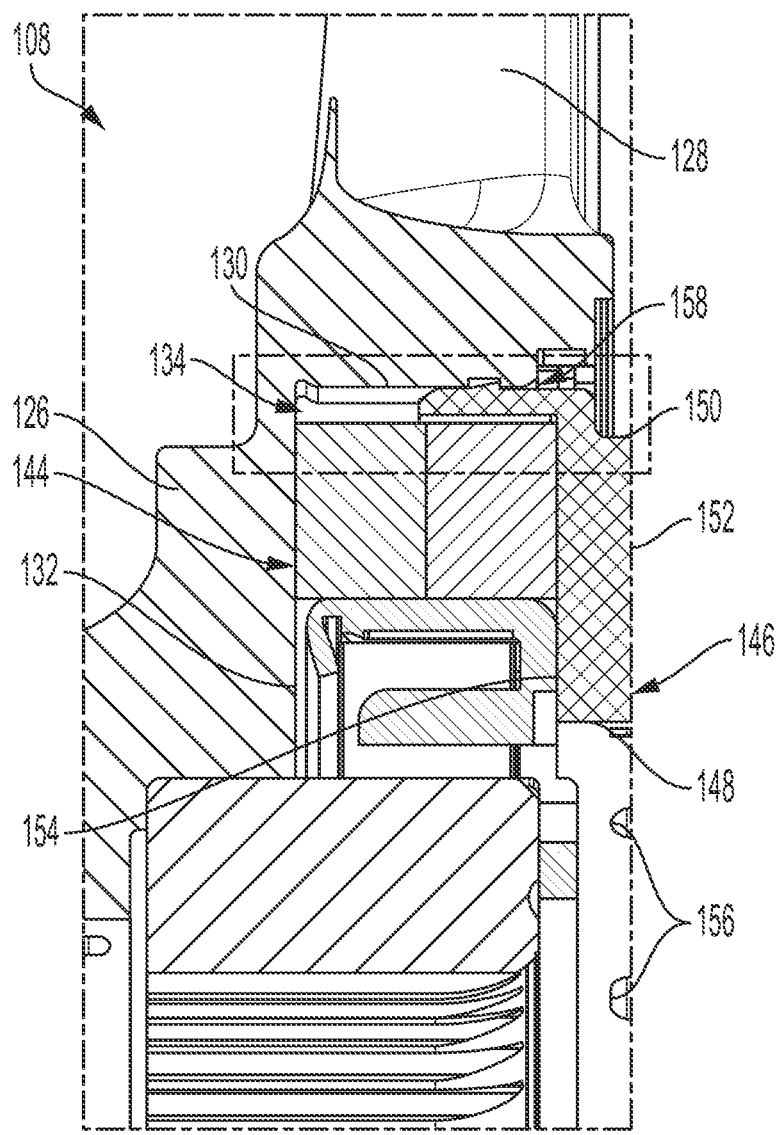
FIG. 2 illustrates an enlarged view of an area of the torque converter shown in FIG. 1 showing a thrust washer according to the present disclosure.
Figure 3:
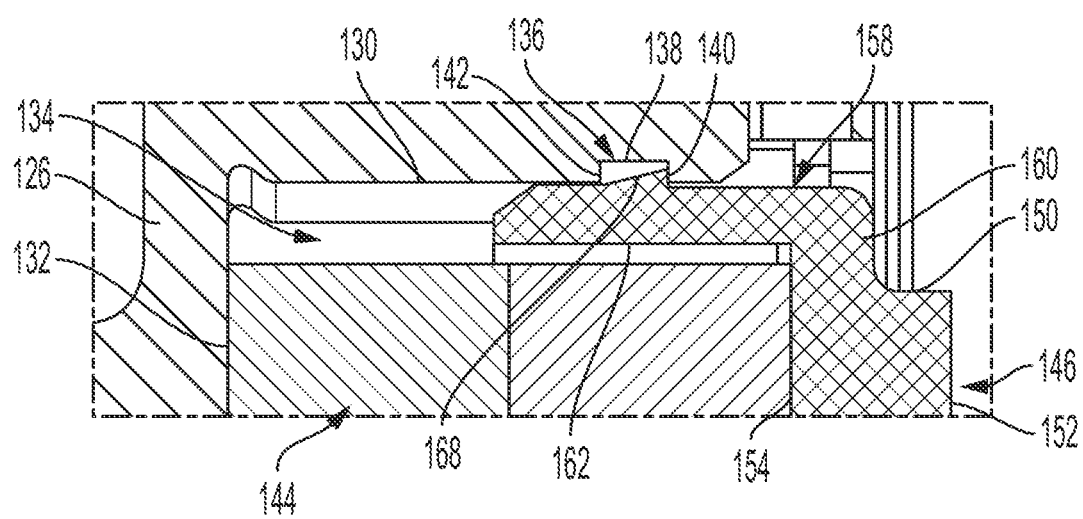
FIG. 3 illustrates an enlarged view of an area of the thrust washer shown in FIG. 2.

Referring to FIGS. 1-3, a portion of a torque converter 100 is illustrated according to one embodiment of the present disclosure. At least some portions of the torque converter 100 are rotatable about a central axis A. While only a portion of the torque converter 100 above the central axis A is shown in FIG. 1, it should be understood that the torque converter 100 can appear substantially similar below the central axis A with many components extending about the central axis A. Words such as "axial," "radial," "circumferential," "outward," etc. as used herein are intended to be with respect to the central axis A.

The torque converter 100 includes: a front cover 102 arranged to receive torque; an impeller assembly 104; a turbine assembly 106; and a stator assembly 108. The impeller assembly 104 includes: an impeller shell 110 non-rotatably connected to the front cover 102; at least one impeller blade 112 attached to an inner surface of the impeller shell 110; and an impeller hub 114 fixed to a radially inner end of the impeller shell 110. The turbine assembly 106 includes: a turbine shell 116; and at least one turbine blade 118 attached to the turbine shell 116. By "non-rotatably connected" components, we mean that: the components are connected so that whenever one of the components rotate, all the components rotate; and relative rotation between the components is not possible. Radial and/or axial movement of non-rotatably connected components with respect to each other is possible, but not required.

The torque converter 100 may include a damper assembly 120. The damper assembly 120 is positioned axially between the front cover 102 and the turbine assembly 106 and is configured for transferring torque from the front cover 102 to a transmission input shaft 122.

The stator assembly 108 is disposed axially between the turbine assembly 106 and the impeller assembly 104 to redirect fluid flowing from the turbine blade 118 before the fluid reaches the impeller assembly 104 to increase the efficiency of torque converter 100. For example, the impeller blade 112, when rotated about the central axis A, pushes fluid outwardly. The fluid pushes against the turbine assembly 106, causing the turbine assembly 106 to revolve about the central axis A. The stator assembly 108 functions to return the fluid from the turbine assembly 106 back to the impeller assembly 104 with minimal or no power loss. Drive power is transmitted from the turbine assembly 106 to the transmission input shaft 122.

The stator assembly 108 includes a stator body 126 and at least one stator blade 128 attached thereto. The stator body 126 includes an axial wall 130 radially spaced from the central axis A and a radial wall 132 extending radially inward from the axial wall 130. The axial wall 130 extends along the central axis A. The axial wall 130 and the radial wall 132 define a cavity 134.

The axial wall 130 includes a channel 136 extending radially outwardly from the axial wall 130. The channel 136 may extend at least partially circumferentially about the central axis A. For example, the axial wall 130 may include a plurality of channels 136 circumferentially spaced from each other about the central axis A. As another example, the axial wall 130 may include one channel 136 extending entirely circumferentially about the central axis A. The channel 136 may be disposed closer to a distal end of the axial wall 130 than to the radial wall 132. The channel 136 may include an axial surface 138 disposed radially outside of the axial wall 130 and radial surfaces 140, 142 each extending radially outward from the axial wall 130 to the axial surface 138.

The stator assembly 108 further includes a one-way clutch 144 engaged with the stator body 126 and disposed in the cavity 134. For example, the one-way clutch 144 may include an outer race (not numbered) spaced from the axial wall 130, an inner race (not numbered) connected to an inner diameter of the radial wall 132, and rollers (not numbered) arranged between the inner race and the outer race. The one-way clutch 144 may be retained in the cavity 134, e.g., via press-fit connection, staking, etc.

The stator assembly 108 further includes an axial thrust washer 146 in contact with the one-way clutch 144. The axial thrust washer 146 is provided axially between the stator assembly 108 and the impeller assembly 104. The axial thrust washer 146 may, for example, be formed by injection molding, machining, profile extrusion, etc. The axial thrust washer 146 may be deflectable and may be made of plastic or other suitable materials.

The axial thrust washer 146 includes an inner circumference 148 and an outer circumference 150. The inner circumference 148 defines an opening (not numbered) concentric with the central axis A. The axial thrust washer 146 includes a thrust surface 152 and a supporting surface 154 opposite the thrust surface 152. The thrust surface 152 and the supporting surface 154 may each extend from the inner circumference 148 to the outer circumference 150.

The supporting surface 154 may be configured to contact the one-way clutch 144. For example, the supporting surface 154 may be configured to directly contact the outer race and/or a cage (not numbered) supporting the rollers of the one-way clutch 144.

The thrust surface 152 faces the impeller shell 110. Specifically, the thrust surface 152 faces a radially extending portion (not numbered) of the impeller shell 110 that is disposed radially between a rounded or torus portion (not numbered) and the impeller hub 114. The thrust surface 152 may be configured to maintain a hydrodynamic film that prevents the thrust surface 152 from contacting the impeller shell 110. The thrust surface 152 may, for example, include a plurality of grooves 156 circumferentially spaced from each other (see FIG. 4). Each groove 156 may extend from the inner circumference 148 to the outer circumference 150.

The axial thrust washer 146 includes an axial retention element 158 disposed on the outer circumference 150 thereof. The axial thrust washer 146 may include any suitable number of axial retention elements 158. For example, the axial thrust washer 146 may include a plurality of axial retention elements 158 circumferentially spaced from each other about the central axis A (see FIGS. 4-5).

The axial retention element 158 includes a radial portion 160 extending radially outwardly from the outer circumference 150 of the axial thrust washer 146. The radial portion 160 may extend radially outwardly from the supporting surface 154. The radial portion 160 may be spaced from the thrust surface 152.

The axial retention element 158 further includes an axial portion 162 radially spaced from the outer circumference 150 of the axial washer 146. The radial portion 160 extends from the outer circumference 150 of the axial washer 146 to the axial portion 162. The axial portion 162 extends axially from the radial portion 160, e.g., an end thereof, towards the radial wall 132. The axial portion 162 may be configured to contact the axial wall 130. Additionally, the axial portion 162 may be configured to be spaced from the one-way clutch 144.

Figure 4A:
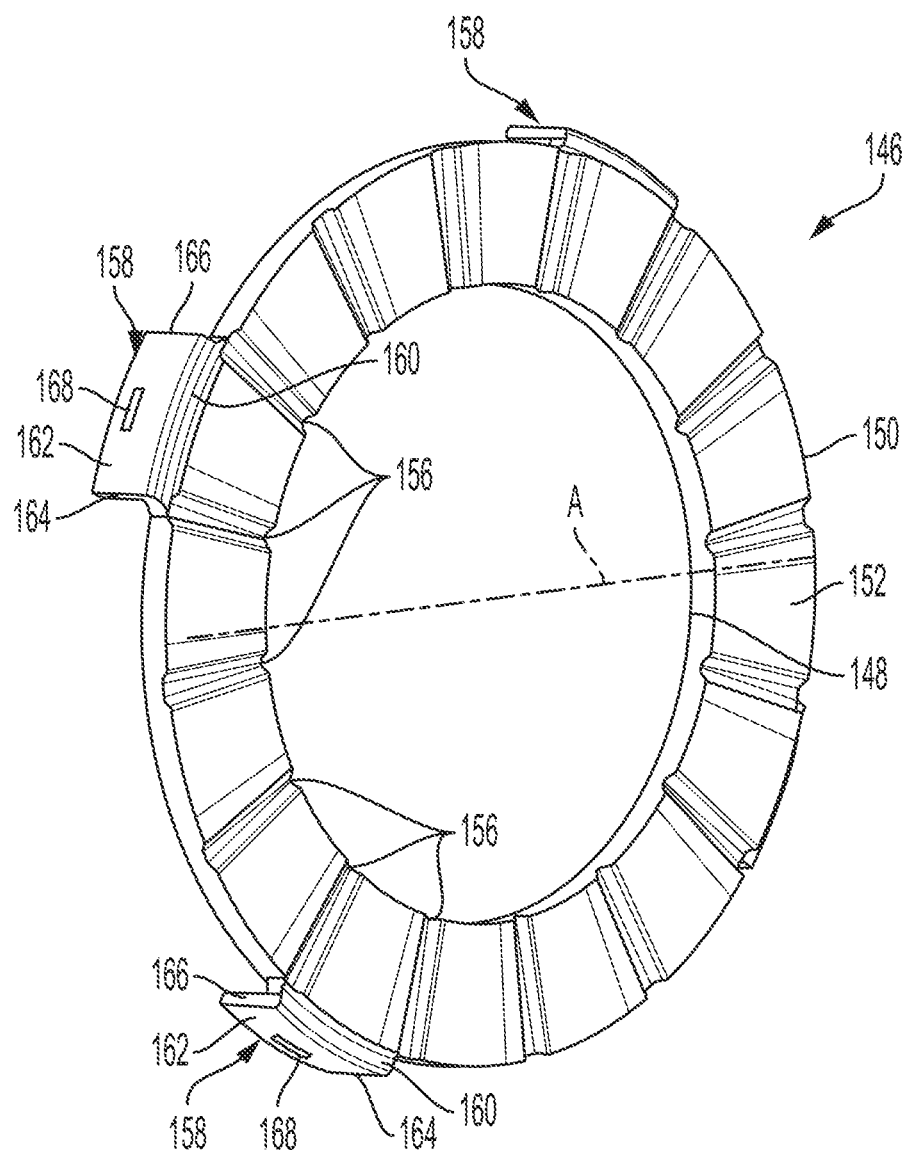
FIG. 4A illustrates a perspective view of the thrust washer.
Figure 4B:
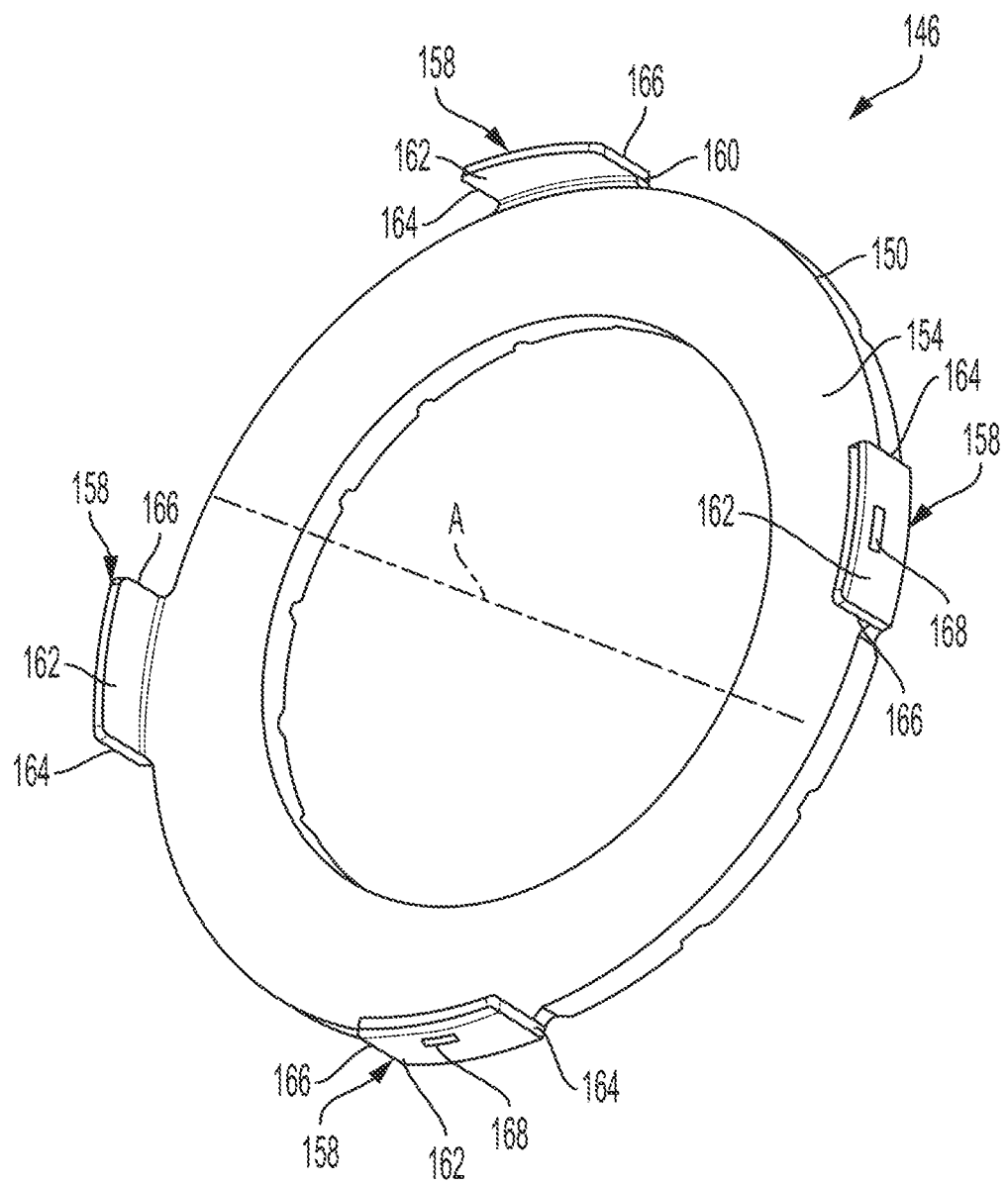
FIG. 4B illustrates another perspective view of the thrust washer shown in FIG. 4A.

Referring to FIGS. 4-5, the axial retention element 158 may include circumference ends 164, 166 spaced from each other. The radial portion 160 and the axial portion 162 may each extend from one end 164 to the other end 166. Each end 164, 166 may be radially aligned with one respective groove 156. That is, a line extending radially outwardly from the central axis A may extend through, in order, a groove 156 and then an end 164, 166 of the axial retention element 158. For example, the ends 164, 166 may be radially aligned with circumferentially adjacent grooves 156, i.e., the axial retention element 158 extends circumferentially from one groove 156 to a circumferentially adjacent groove 156.

The axial retention element 158 further includes a tab 168 disposed on the axial portion 162. The tab 168 may disposed between the radial portion 160 and the distal end of the axial portion 162. The tab 168 may be spaced from at least one of the ends 164, 166 of the axial retention element 158. The tab 168 is configured to connect the axial retention element 158 to the axial wall 130, as shown in FIG. 3. Specifically, the tab 168 is configured to snap fit to the channel 136. During installation of the axial thrust washer 146, the axial wall 130 may deflect the axial retention element 158 radially inwardly about the radial portion 160 such that the tab 168 contacts the axial wall 130. Upon the tab 168 reaching the channel 136, the axial retention element 158 deflects radially outwardly about the radial portion 160 such that the tab 168 is displaced into the channel 136. After installation, the tab 168 directly contacts the radial surface 140 of the channel 136 (see FIG. 3) to axially constrain the axial thrust washer 146.

Embodiments according to the present disclosure provide various advantages including reducing complexity of a stator assembly by non-rotatably connecting a thrust washer to a stator body to prevent relative motion between the thrust washer and stator body while allowing for the removal of additional components such as a side plate.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

LIST OF REFERENCE NUMBERS 100 torque converter
102 front cover
104 impeller
106 turbine
108 stator assembly
110 impeller shell
112 impeller blade
114 impeller hub
116 turbine shell
118 turbine blade
120 damper assembly
122 transmission input shaft
126 stator body
128 stator blade
130 axial wall
132 radial wall
134 cavity
136 channel
138 axial surface
140 radial surface
142 radial surface
144 one-way clutch
146 axial thrust washer
148 inner circumference
150 outer circumference
152 thrust surface
154 supporting surface
156 groove
158 axial retention element
160 radial portion
162 axial portion 164 end
166 end
168 tab
A central axis

What is claimed is:

1. A stator assembly for a torque converter, comprising:
a body rotatable about an axis and having a cavity defined by an axial wall radially spaced from the axis and a radial wall extending radially inward from the axial wall;
a one-way clutch disposed in the cavity; and
a washer including:
a thrust surface facing away from the cavity;
a supporting surface directly contacting the one-way clutch; and
an axial retention element configured to directly connect to the axial wall of the body.

2. The stator assembly of claim 1, wherein the axial wall includes a channel radially aligned with a portion of the one-way clutch, the axial retention element being configured to engage the channel.

3. The stator assembly of claim 2, wherein the axial retention element includes:
a radial portion extending outwardly from an outer circumference of the washer;
an axial portion extending from an end of the radial portion; and
a tab disposed on the axial portion and configured to directly contact a radial surface of the channel.

4. The stator assembly of claim 3, wherein the tab is disposed between an end of the axial portion and the radial portion.

5. The stator assembly of claim 3, wherein the axial portion is disposed radially between a portion of the one-way clutch and a portion of the axial wall.

6. The stator assembly of claim 3, wherein the axial portion is configured to contact a portion of the axial wall and be radially spaced from the one-way clutch.

7. The stator assembly of claim 3, wherein the axial retention element includes circumferential ends spaced from each other, the tab being spaced from at least one circumferential end.

8. The stator assembly of claim 1, wherein the axial retention element extends from the supporting surface.

9. The stator assembly of claim 1, wherein the axial retention element is axially spaced from the thrust surface.

10. The stator assembly of claim 1, wherein the thrust surface includes a plurality of grooves each extending from an inner circumferential surface to an outer circumferential surface of the washer, the grooves being circumferentially spaced from each other.

11. The stator assembly of claim 10, wherein the axial retention element includes circumferential ends spaced from each other, each end being radially aligned with one respective groove.

12. The stator assembly of claim 1, wherein the axial retention element is arranged on an outer circumference of the washer.

13. The stator assembly of claim 1, wherein the axial retention element is disposed radially outside of the one-way clutch.

14. The stator assembly of claim 1, wherein a portion of the axial retention element is radially aligned with a portion of the one-way clutch.

15. A torque converter, comprising:
a front cover arranged to receive a torque;
an impeller having an impeller shell non-rotatably connected to the cover;
a turbine in fluid communication with the impeller and including a turbine shell; and
a stator assembly disposed axially between the impeller shell and the turbine shell, the stator assembly including:
a body rotatable about an axis and having a cavity defined by an axial wall radially spaced from the axis and a radial wall extending radially inward from the axial wall;
a one-way clutch disposed in the cavity; and
a washer including:
a thrust surface contacting one of the impeller shell or the turbine shell;
a supporting surface directly contacting the one-way clutch; and
an axial retention element configured to directly connect to the axial wall of the body.

16. The torque converter of claim 15, wherein the axial retention element extends from the supporting surface.

17. The torque converter of claim 15, wherein the axial retention element is axially spaced from the thrust surface.

18. The torque converter of claim 15, wherein the axial retention element is disposed radially outside of the one-way clutch.

19. The torque converter of claim 15, wherein the axial wall includes a channel radially aligned with a portion of the one-way clutch, the axial retention element being configured to engage the channel.

20. The torque converter of claim 19, wherein the axial retention element includes:
a radial portion extending outwardly from an outer circumference of the washer;
an axial portion extending from an end of the radial portion; and
a tab disposed on the axial portion and configured to directly contact a radial surface of the channel.

* * * * *